United States Patent Office 2,906,054
Patented Sept. 29, 1959

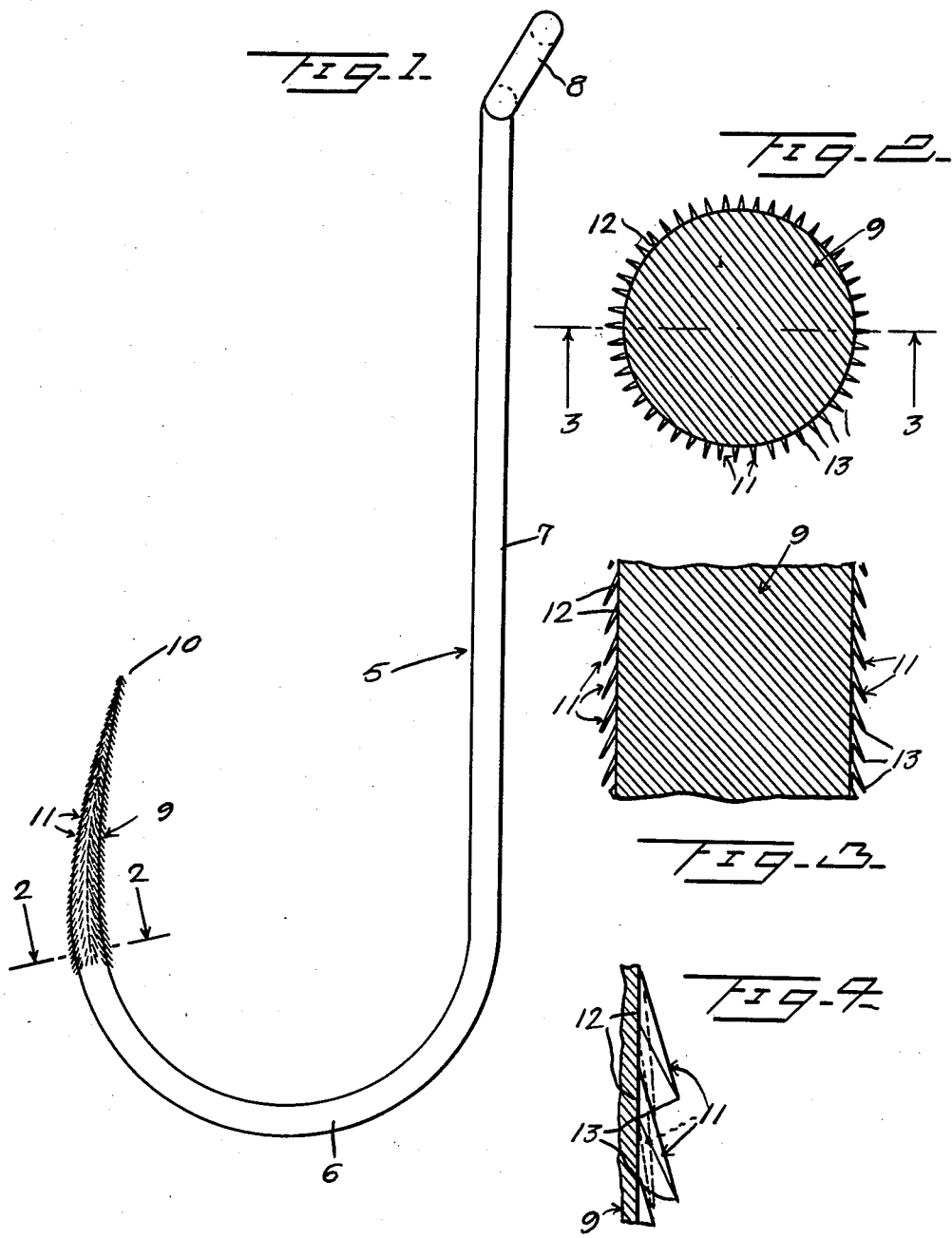

2,906,054
FISHHOOK

James B. Morehead, Norman, Okla.

Application December 23, 1957, Serial No. 704,801

2 Claims. (Cl. 43—43.16)

This invention relates to a novel fishhook wherein the large barb conventionally provided near the pointed end of the shorter leg of the fishhook is eliminated and replaced by a holding means which will as effectively hold a fish and which will enable the pointed end of the fishhook to much more readily penetrate the flesh and become secured therein.

Many fish are lost due to the fact that the fish is able to disengage itself from the hook due to the difficulty in causing the large barb of the hook to penetrate sufficiently into the flesh to effect a positive securement of the hook.

A primary object of the present invention is to overcome this defect in conventional fishhooks and to provide a slender tapered point which can readily penetrate the flesh of a fish so that it is substantially impossible for the point not to penetrate the flesh once it is in the mouth of a fish.

Another object of the invention is to provide a fishhook having a pointed end provided with means offering a minimum of resistance to penetration of the pointed end of the fishhook but which will effectively resist extraction of said pointed end from the flesh.

Another object of the invention is to provide a fishhook which, in use, will eliminate the need for "setting of the hook" as is conventional with barbed hooks and which results in the loss of many fish where a "setting of the hook" is not properly accomplished.

Various other objects and advantages of the invention will hereinafter become more fully apparent from the following description of the drawing, illustrating a presently preferred embodiment thereof, and wherein:

Figure 1 is an enlarged side elevational view of the fishhook;

Figure 2 is a cross sectional view taken through the shorter leg of the fishhook substantially along a plane as indicated by the line 2—2 of Figure 1 and on a greatly enlarged scale;

Figure 3 is a fragmentary longitudinal sectional view of a portion of the shorter leg of the fishhook, taken substantially along a plane as indicated by the line 3—3 of Figure 2, and Figure 4 is a fragmentary view similar to a peripheral portion of Figure 3 but on a greatly enlarged scale.

Referring more specifically to the drawing, the fishhook 5 includes a bend portion 6 having a substantially straight shank 7 extending from one end thereof and which terminates at its distal end in the usual line engaging eye 8.

The other shorter leg 9 of the fishhook 5 extends from the other end of the bend portion 6 and is preferably tapered throughout its length and terminates in a point 10. Said shorter leg 9 is substantially shorter than the shank 7 and instead of being provided with a large barb, as is conventional, is provided with a plurality of minute spines 11 which extend at a slight angle from the surface of the leg 9 and in a direction away from the point 10. The spines 11 taper from their root ends 12 which are integral with the leg 9 to their pointed rear free ends 13. The spines 11 are preferably disposed completely around the leg 9, as seen in Figures 1 and 2.

The fishhook 5 is formed from a good grade of steel and the spines 11 are struck from the surface of the leg 9 and possess sufficient resiliency so that said spines may collapse and lie substantially against the leg 9 or may be sprung out therefrom to substantially beyond their positions as seen in Figures 3 and 4. The spines 11 are shown in substantially their normal positions relative to the periphery of the leg 9 in Figures 3 and 4 and are shown collapsed against said leg in dotted lines in Figure 4.

From the foregoing it will be readily apparent that the point 10 will readily penetrate the flesh of a fish and the spines 11 by contact with the flesh will be collapsed against the leg 9, as seen in dotted lines in Figure 4, so that the leg 9 will penetrate the flesh of the fish to a substantial depth most readily as it will provide no protrusions, such as a large barb, to obstruct and resist such penetration. However, after penetration, the resilient spines 11 will tend to resume their normal partially erect positions as seen in Figure 3 and in full lines in Figure 4. Accordingly, the spines will effectively resist extraction of the leg 9 from the flesh, and any movement of the leg 9 tending to extract it will result in the pointed ends 13 of the spines penetrating the flesh and the spines then being sprung toward erect positions, from their positions of Figure 3 and their full line positions of Figure 4, to provide a substantial holding action.

However, since the spines 11 are very minute as compared to the conventional barb of a fishhook, the leg 9 may be more readily extracted from the flesh of a fish in removal of the hook than is possible in removing the barbed end of a conventional fishhook. In addition, the spines 11 are not of sufficient size to catch behind bony or other rigid structure in the flesh as frequently occurs in using a conventional barbed hook and which frequently makes removal of such barbed hooks extremely difficult.

Various modifications and changes are contemplated and may be resorted to, without departing from the function or scope of the invention as hereinafter defined by the appended claims.

I claim as my invention:

1. A fishhook having a short leg terminating in a point, a plurality of overlapping minute spines covering and forming the exterior of said leg, each spine being struck out from the leg and including a root end integrally joined with said leg and a free end, said spines being flared outwardly relative to said leg in a direction away from the pointed end of the leg, and said spines being yieldably collapsible against the leg and yieldably expansible toward erect positions relative to the leg.

2. A fishhook as in claim 1, said short leg being tapered throughout a substantial portion of its length toward the pointed end thereof.

References Cited in the file of this patent

UNITED STATES PATENTS

| | | |
|---|---|---|
| 620,896 | Edgar | Mar. 14, 1899 |
| 1,152,698 | Bonner | Sept. 7, 1915 |

FOREIGN PATENTS

| | | |
|---|---|---|
| 102,001 | Austria | 1925 |
| 214,228 | Great Britain | 1924 |